Patented Apr. 18, 1950

2,504,468

UNITED STATES PATENT OFFICE 2,504,468

PROCESS OF PREPARING TRINUCLEAR CYANINE DYES

Thomas R. Thompson, Binghamton, N. Y., assignor to General Aniline & Film Corporation, New York, N. Y., a corporation of Delaware No Drawing. Application November 18, 1947, Serial No. 786,813

8 Claims. (Cl. 260—240.1)

This invention relates to trinuclear cyanine dyes and particularly to an improved method of preparing the same.

Trinuclear cyanine dyes have been prepared by the method described in United States Patent 2,388,963. The method consists in first quaternizing a cyclammonium base, containing a reactive thiol group, and condensing it with an N-ethyl rhodanic acid to obtain the merocyanine intermediate. This procedure involves two steps and requires about 4 hours time. The merocyanine intermediate is then fused with a mixture of a cyclammonium base and a quaternizing agent, such as methyl p-toluenesulfonate for 2½ to 3½ hours. After cooling the melt, pyridine is added and the mixture reheated, under reflux, for 20 to 30 minutes. The reaction mixture is then poured into an aqueous solution of potassium bromide and the final dye obtained by recrystallization from alcohol. The minimum time required for the latter two steps is approximately from 3 to 4 hours, exclusive of the time required to cool the reaction mixture.

Theoretically, the trinuclear dyes should be capable of production by treating an N-alkyl rhodanine with an alkyl salt to effect quaternization of the hetero nitrogen atom thereof, and conversion of the thio-keto group to a thio-ether group, the reaction of the thio-ether group with the reactive grouping of a cyclammonium salt and the linking of the intermediate so formed to a cyanine dye intermediate through the reactive methylene group of the thiazolone ring. In other words, it would seem that said dyes would form by carrying out, with the N-alkyl rhodanine per se, the last step of the conventional process and using the thus formed intermediate for reaction with another mol of a cyanine dye intermediate. Very surprisingly, however, it has been ascertained that the N-alkyl rhodanines, although reactive with alkyl salts, do not form alkyl rhodanines which are reactive with a cyclammonium salt to yield thiazolone cyanine dye intermediates.

Because of this, the art has become firmly convinced that, in order to prepare trinuclear cyanine dyes of the rhodacarbocyanine type, it is necessary to treat a preformed merocyanine dye with an alkyl salt to simultaneously effect quaternization of the nitrogen atom of the rhodanine ring system and the conversion of the thio-keto group to a thio-ether group, and to react the resulting salt with a cyclammonium quaternary salt of the type used in the formation of cyanine dyes. The process steps involved in this preparation are not only tedious but time-consuming.

It is an object of the present invention to provide an improved and simplified method for the preparation of trinuclear cyanine dyes.

A further object of the present invention is a method of producing rhodacarbocyanine dyes without first forming the usual merocyanine dye intermediates.

A still further object is to provide a simpler method whereby trinuclear cyanine dyes in excellent yield are obtained.

Other objects and advantages will become apparent from the following description.

I have found that trinuclear cyanine dyes are prepared in excellent yield and in readily purifiable form by treating a cyclammonium quaternary salt, containing a particular reactive group, of the type commonly employed in cyanine dye syntheses with a thiazolone cyanine dye in a suitable solvent, such as an aliphatic alcohol, e. g., methyl, ethyl, n-propyl, isopropyl, and the like, in the presence of a basic condensing agent such as trimethylamine, triethylamine, pyridine, methyl pyridine, ethyl pyridine, quinoline, potassium carbonate, and the like, at room temperature for about 1 hour or by heating the reaction mixture for a matter of minutes.

The dyes obtained by the foregoing procedure are characterized by the following general formula:

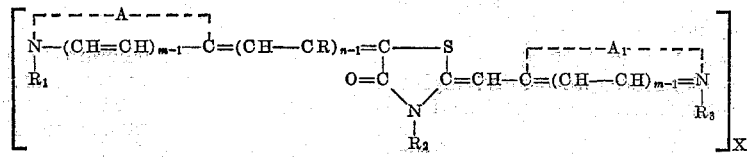

wherein A and A₁ are the same or different and are the residues of heterocyclic nitrogenous nuclei of the classes common in cyanine dyes, e. g., oxazoles, thiazoles, selenazoles, and their polycyclic homologues such as those of the benzene, naphthalene, acenaphthene, and anthracene series, pyridine and its polycyclic homologues, such as quinoline and α- and β-naphthaquinolines, indolenines, diazines, such as pyrimidines and quinazolines, diazoles (e. g., thio-β,β′-diazole), oxazolines, thiozolines and selenazolines (the polycyclic compounds of these series being substituted if desired in the carbocyclic rings with one or more conventional groups, such as alkyl or aryl, as below, amino, hydroxy, alkoxy, i. e., methoxy, ethoxy, etc., and methylene-dioxy groups, or by halogen atoms, i. e., chlorine, bromine, etc.), $m$ represents 1 or 2, $n$ represents an integer from 1 to 4, R represents hydrogen, an alkyl group, e. g., methyl, ethyl, propyl, butyl, or phenyl group, R only being alkyl or phenyl when $n$ represents 2, $R_1$ and $R_3$ are the same or different and represent alkyl, aralkyl, or substituted groups of this type, e. g., methyl, ethyl, propyl, butyl, hydroxyethyl, ethoxyethyl, benzyl, menaphthyl, and the like, $R_2$ represents an alkyl, allyl, aryl, or aralkyl group, e. g., methyl, ethyl, propyl, phenyl, naphthyl, tolyl, benzyl, phenethyl, and the like, and X represents an acid radical, e. g., chloride, bromide, iodide, or alkyl sulfate, alkyl p-toluenesulfonate or perchlorate.

The cyclammonium quaternary salts of the type commonly employed in cyanine dye syntheses, containing a particular reactive group, and treated with the thiazolone cyanine dye, are characterized by the following general formula:

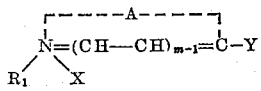

wherein A, $m$, $R_1$ and X have the same values as above, and Y represents a reactive group, such as alkylmercapto, e. g., methyl-, ethyl-, propyl-, and butylmercapto, arylmercapto, e. g., phenylmercapto, tolylmercapto, naphthylmercapto, etc., β-alkylmercaptovinyl, e. g., β-methyl-, β-ethyl-, β-propyl-, and β-butylmercaptovinyl, β-arylmercaptovinyl, e. g., β-phenyl-, β-tolyl-, and β-naphthylmercaptovinyl, β-alkylmercapto-β-alkyl- or aryl-vinyl, e. g., β-methylmercapto-β-methylvinyl, -ethylvinyl, -propylvinyl, and -butylvinyl, β-ethylmercapto-β-methylvinyl, -ethylvinyl, -propylvinyl, and -butylvinyl, β-butylmercapto-β-ethylvinyl, -propylvinyl, and -butylvinyl, β-ethylmercapto-β-phenylvinyl, and the like, substituted aminovinyl and polyvinyl, e. g., β-anilinovinyl, β-acetanilidovinyl, β-piperidinovinyl, and β-morpholinovinyl, 4-acetanilido-1,3-butadienyl, 4-anilino-1,3-butadienyl, 4-piperidino-1,3-butadienyl, 4-morpholino-1,3-butadienyl, 6-acetanilido-1,3,5-hexatrienyl, 6-anilino-1,3,5-hexatrienyl, 6-piperidino-1,3,5-hexatrienyl, 6-morpholino-1,3,5-hexatrienyl, and the like.

The foregoing reactive groups may be graphically illustrated as follows: R₄—S—
Alkylmercapto and arylmercapto

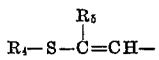

β-alkylmercaptovinyl
β-arylmercaptovinyl
β-alkylmercapto-β-alkylvinyl
β-alkylmercapto-β-arylvinyl

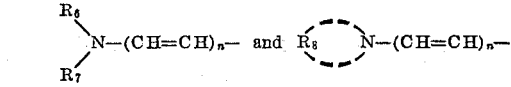

β-substituted aminovinyl (when $n=1$)
4-substituted aminobutadienyl (when $n=2$)
6-substituted aminohexatrienyl (when $n=3$)

wherein $R_4$ is alkyl or aryl, $R_5$ is hydrogen, alkyl or aryl, and $R_6$ is phenyl, $R_7$ is hydrogen or an acetyl group, and $R_8$ represents the atoms necessary to complete a piperidine or morpholine ring structure.

As typical examples or cyclammonium quaternary salts useful in the present invention, the following may be mentioned: 2-methyl-mercaptobenzothiazole ethiodide, 2-phenylmercaptobenzothiazole ethiodide, 2-(β-ethyl-β-methyl-mercaptovinyl) benzothiazole ethiodide, 2-β-acetanilidovinyl-benzoxazole methiodide, 2-(4-acetanilido-1,3-butadienyl)benzothiazole ethiodide, 2-(6-anilino-1,3,5-hexatrienyl)benzothiazole ethiodide, and the like.

The thiazolone cyanine dyes, utilized as the co-reactant with the foregoing cyclammonium quaternary salts, are prepared according to the method described in application Serial No. 786,814 filed on November 18, 1947.

In general, the method involves treating an appropriately substituted thioamide with an α-halogen substituted acetic acid. The reaction involved, while utilizing chloroacetic acid, is believed to take place as follows:

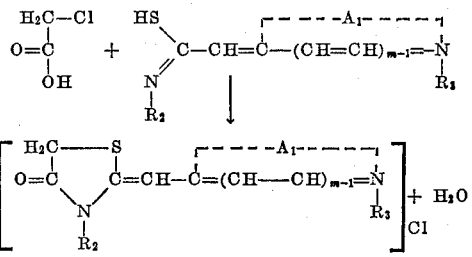

wherein $A_1$, $m$, $R_2$ and $R_3$ have the same values as above.

The reaction may be effected by fusing the co-reactants, but proceeds more smoothly when carried out in a solvent, such as an alcohol or acetic acid at a temperature ranging from 75° to 120° C. for a period of 5 to 60 minutes.

The preparation of the substituted thioamides follows the method of Schneider et al (Ber. 57, 522–532), and consists of reacting a nitrogenous heterocyclic quaternary ammonium salt, of the type commonly employed in cyanine dye synthesis and containing a reactive methyl group in α- and γ-positions to the ring nitrogen atom thereof, with an alkyl, allyl, aryl or aralkylisothiocyanate in the presence of a base, such as triethylamine or pyridine. The reaction is believed to take place as follows:

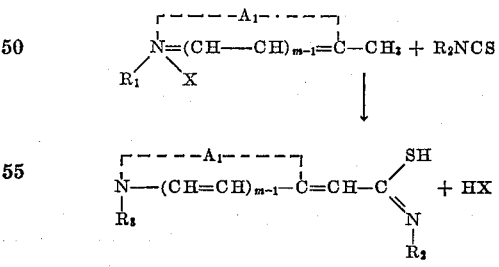

wherein $A_1$, $m$, $R_1$, $R_2$, $R_3$, and X have the same values as above.

The following examples are illustrative of the method used for preparing the thiazolone cyanine dyes.

*Example I*

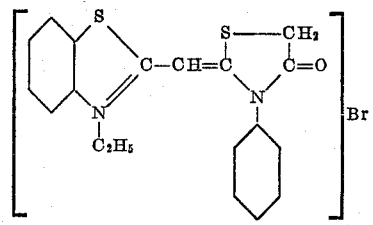

A mixture of 25 grams of α-(3-ethylbenzothiazolylidene)thioacetanilide and 25 grams of bromacetic acid was heated in 50 cc. of n-butanol for 10 minutes at 110° C., the solution becoming deep yellow in color. The mixture was cooled, stirred with ether, filtered, and washed with ether. The residue was dried at 80° C. to yield 34.9 grams of a solid, melting at 231–236° C. A ten gram fraction of this was recrystallized from methanol to yield 7.7 grams of the final dye, melting at 233–234° C.

*Example II*

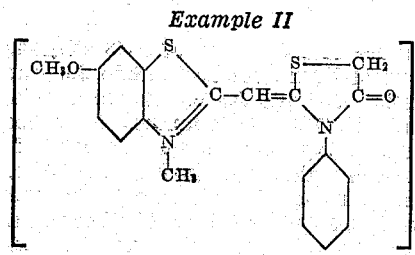

A mixture of 5 grams of α-(3-methyl-6-methoxybenzothiazolylidene)thioacetanilide and 5 grams of bromacetic acid in 10 cc. of n-butanol was heated on a steam bath with stirring for 15 minutes, the solution becoming yellow in color. The mixture was treated with a small quantity of ether, filtered, and washed with ether. The solid product was recrystallized from methanol to give 4.6 grams of dye crystals melting at 216–217° C.

*Example III*

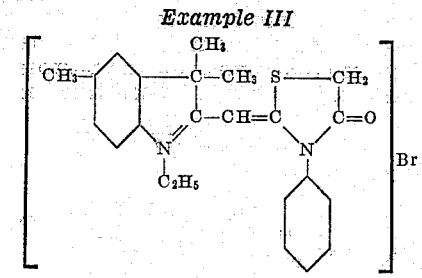

6.9 grams of α-(1-ethyl-3,3,5-trimethylindolinylidene)thioacetanilide were heated with 6.9 grams of bromacetic acid in 25 cc. of n-butanol at 105–110° C. for 10 minutes. The mixture was treated with ether and the ether layer decanted. The black liquid was stirred with isopropanol and filtered. The residue was recrystallized from methanol to yield 1.7 grams of the final dye having a melting point at 236–238° C.

*Example IV*

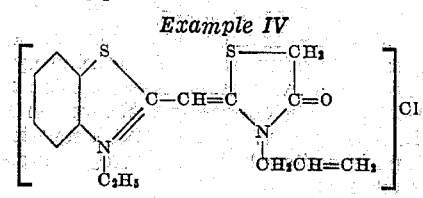

A mixture of 3.5 grams of α-(3-ethylbenzothiazolylidene)N-allylthioacetamide, 3.5 grams of chloroacetic acid, and 7 cc. of n-butanol was boiled for 3 minutes. After cooling, the product was precipitated with ether to yield 4.3 grams of crystals melting at 227–230° C.

*Example V*

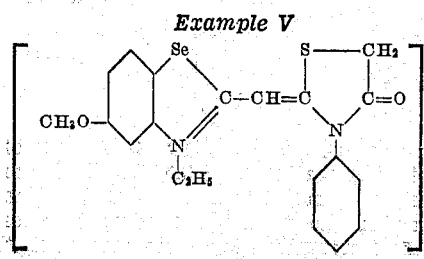

A mixture of 4.11 grams of α-(3-ethyl-5-methoxybenzoselenazolylidene)thioacetanilide, 4.11 grams of bromacetic acid, and 45 cc. of n-butanol was heated at 90° C. for 20 minutes and at 110° C. for 10 minutes. The thick slurry of greenish crystals was thinned with three volumes of ether and filtered to yield 5.0 grams of a product, melting at 283–284° C.

*Example VI*

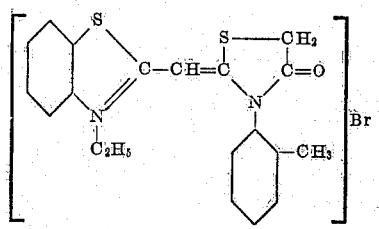

4 grams of α-(3-ethylbenzothiazolylidene) thioacet-o-toluide, 4 grams of bromacetic acid, and 8 cc. of n-butanol were treated as in Example I to yield 3.9 grams of a thiazolone cyanine dye melting at 240–241° C.

*Example VII*

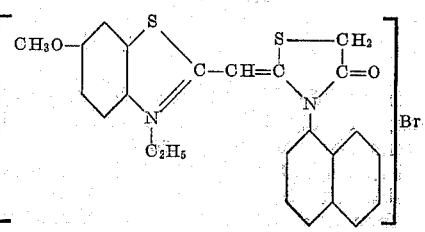

A mixture of 1.5 grams of α-(3-ethyl-6-methoxybenzothiazolylidene)thioacet - α - naphthalide was heated with an equal weight of bromacetic acid in 5 cc. of n-butanol at 110° C. for 5 minutes. The yellow crystals, which separated on cooling, weighed 0.75 gram and melted at 201–203° C.

*Example VIII*

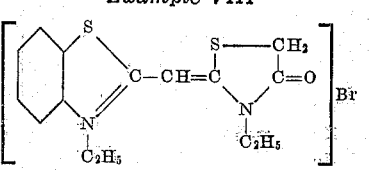

A mixture of 1.5 grams of α-(3-ethylbenzothiazolylidene)-N-ethylthioacetamide, 1.5 grams of bromacetic acid and 5 cc. of acetic acid was heated at 120° C. for 5 minutes. After cooling, the product was precipitated with ether and dried to yield 2.07 grams.

*Example IX*

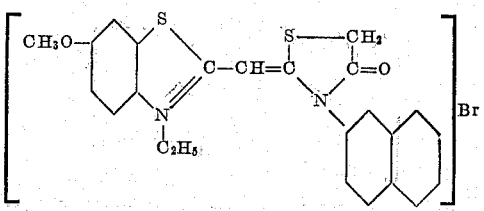

A mixture of 1.3 grams of α-(3-ethyl-6-methoxybenzothiazolylidene) thioacet -β- naphthalide, 1.3 grams of bromacetic acid and 5 cc. of n-butanol was heated at 110° C. for 10 minutes. After precipitation with ether and crystallization from n-propyl alcohol, there were obtained 1.01 grams of crystals melting at 217–219° C.

Example X

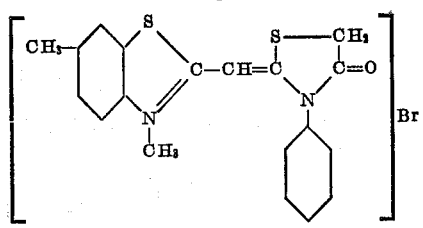

A mixture of 20 grams of α-(3,6-dimethylbenzothiazolylidene)thioacetanilide, 20 grams of bromacetic acid, and 25 cc. of n-butanol was heated at 110° C. for 5 minutes. The product was precipitated with ether and purified by boiling-out with isopropanol to yield 21.93 grams, melting at 230-231° C.

Example XI

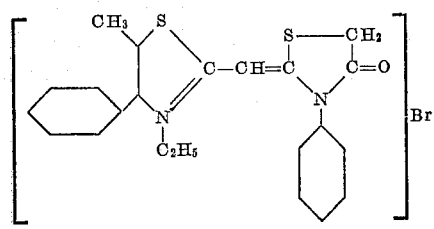

A mixture of 0.65 gram of α-(3-ethyl-5-methyl-4-phenylthiazolylidene)thioacetanilide, 1.0 gram of bromacetic acid, and 2 cc. of acetic acid was heated at 115° C. for 1 hour. The product was precipitated with ether and subsequently washed with ether by decantation. The viscous product does not solidify and may be used directly in dye synthesis.

Example XII

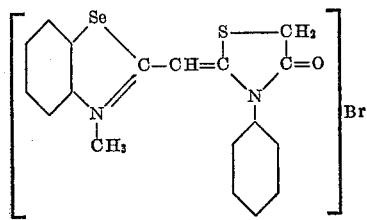

A mixture of 14 grams of α-(3-methylbenzoselenazoylidene)thioacetanilide, 5.7 grams of bromacetic acid, and 10 cc. of n-butanol was warmed on the steam bath for 5 minutes. The reaction mixture became thick, and after thinning with ether, the product was filtered to yield 13.0 grams melting at 266-272° C.

Example XIII

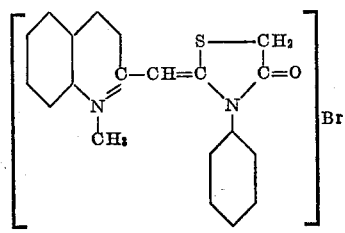

A mixture of 5.5 grams of α-(1-methyl-2-quinolylidene)thioacetanilide, and an equal weight of bromacetic acid was dissolved in 50 cc. of n-butanol and heated at 100° C. for 10 minutes. On cooling, yellow crystals formed which were filtered and washed with ether. Recrystallization from methanol yielded yellow crystals melting at 212° C.

Example XIV

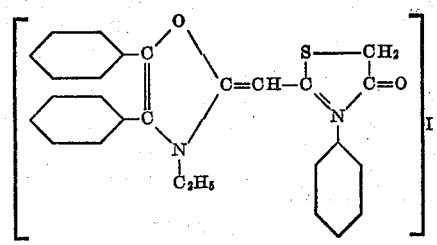

A mixture of 2.5 grams of α-(3-ethyl-4,5-diphenyloxazolylidene)thioacetanilide, 2.5 grams of bromacetic acid, and 2.5 cc. of acetic acid was heated at 95° C. for 30 minutes. After cooling, the product was precipitated with ether and converted to the iodide by refluxing with 15 cc. of a saturated solution of sodium iodide in acetone. After cooling, an equal volume of ether was added and the light yellow crystals were filtered and washed with ether to yield 1 gram of final dye melting at 156-7° C.

The foregoing thiazolone cyanine dye salts may be converted to salts other than halogen by treating an alcohol solution of the halogen salt with an aqueous or aqueous-alcohol solution containing a sodium or potassium salt of perchloric or thiocyanic acid.

The following examples describe, in detail, the improved and simplified method of preparing trinuclear cyanine dyes from the foregoing thiazolone cyanine dyes, but it is to be understood that they are given merely for the purpose of illustrations, and are not to be construed as limitative.

Example XV

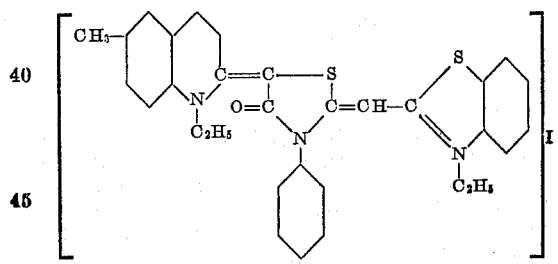

A solution of 0.43 gram of the product of Example I, and 0.36 gram of 2-methylmercapto-6-methylquinoline ethiodide in 10 cc. of methanol containing 20 drops of triethylamine was boiled for a short period of time. Red leaf-like crystals separated on cooling and were purified by crystallization from methanol. The final dye melted at 241-2° C., and showed an absorption maximum in methanol at 544 mµ, and a sensitization maximum in a silver bromide photographic emulsion at 590 mµ.

Example XVI

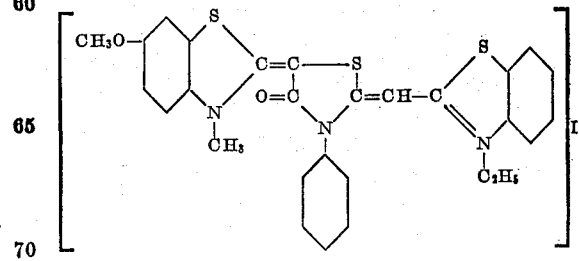

This dye was prepared from 0.87 gram of the product of Example I and 0.64 gram of 2-methylmercapto-6-methoxybenzothiazole methiodide by following the general procedure of Example XV. After crystallization from methanol, there was obtained 0.64 gram of orange dye crystals, melting at 233–236° C. with decomposition. A solution of the dye in methanol showed an absorption maximum at 510 mμ, and a sensitization maximum in a silver bromide emulsion at 560 mμ.

*Example XVII*

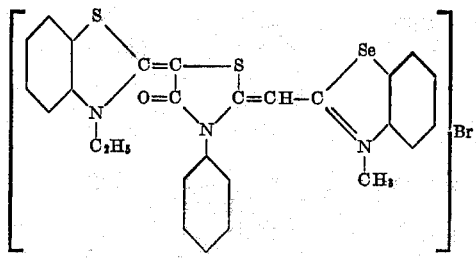

A mixture of 0.7 gram of the thiazolone cyanine dye of Example XII, and 0.8 gram of 2-ethylmercaptobenzothiazole ethyl p-toluenesulfonate was dissolved in 15 cc. of methanol containing 20 drops of triethylamine and treated as in Example XV to yield glistening, orange-red crystals, melting at 247° C. A solution of the dye in methanol showed an absorption maximum at 503 mμ, and a sensitization maximum in a silver bromide emulsion at 590 mμ.

*Example XVIII*

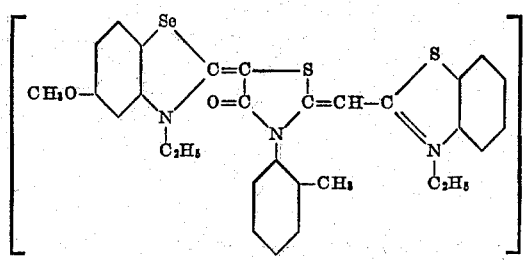

This dye was prepared according to the procedure of Example XV by heating 2-methylmercapto-5-methoxybenzoselenazole ethosulfate and the thiazolone cyanine of Example VI. The dye was converted to the iodide salt by treating its alcoholic solution with aqueous potassium iodide. The crystals were orange, flat prisms with a gold reflex, melting at 261–265° C. A solution of the dye in methanol showed an absorption maximum at 509 mμ, and a sensitization maximum in a silver bromide emulsion at 550 mμ.

*Example XIX*

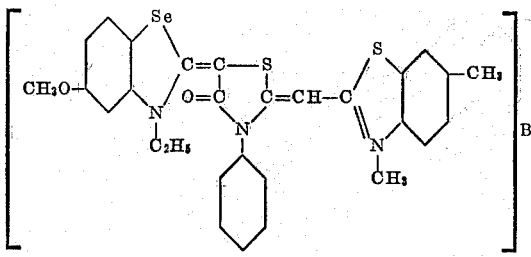

A mixture of 0.7 gram of 2-methylmercapto-5-methoxybenzoselenazole ethosulfate, 0.8 gram of the product of Example X, 25 cc. of methanol, and 0.5 cc. of triethylamine was stirred at 25° C. for 1 hour. 5 cc. of a 50% aqueous potassium bromide were added and the dye filtered and washed with water and ether. Purification was effected by recrystallization from methanol. The dye melted at 234–5° C. A solution of the dye in methanol showed an absorption maximum at 510 mμ, and a sensitization maximum in a silver bromide emulsion at 555 mμ.

*Example XX*

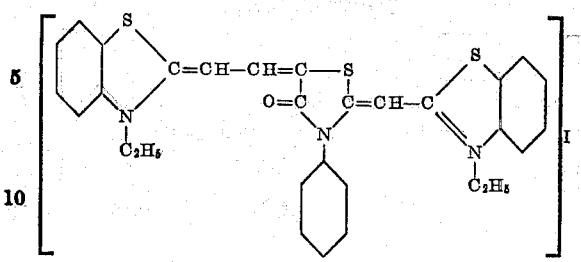

A solution of 0.45 gram of 2-(β-acetanilidovinyl) benzothiazole ethiodide and 0.44 gram of the thiazolone cyanine of Example I in 30 cc. of methanol was heated on the steam bath in the presence of 0.5 cc. of triethylamine for 5 minutes. The dye crystals, which separated on cooling, were recrystallized from methanol to yield 0.55 gram of a product melting at 236–9° C. A solution of the dye in methanol showed an absorption maximum at 590 mμ, and a sensitization maximum in a silver bromide emulsion at 640 mμ.

*Example XXI*

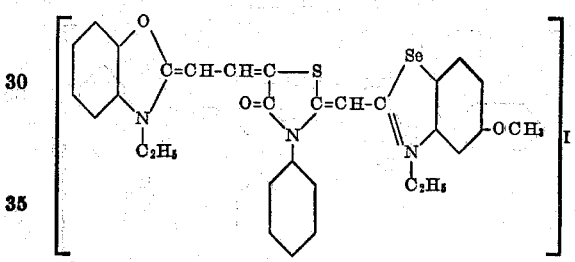

A mixture of 0.65 gram of 2-(β-acetanilidovinyl) benzoxazole ethiodide and 0.77 gram of the product of Example V was dissolved in 50 cc. of methanol and 1 cc. of triethylamine added. The solution was heated at reflux for 25 minutes and dye crystals separated on cooling in the form of fine needles. Purification was effected by crystallization from methanol to yield 0.45 gram of a product melting at 273–4° C. A solution of the dye in methanol showed an absorption maximum at 570 mμ, and a sensitization maximum in a silver bromide emulsion at 620 mμ.

*Example XXII*

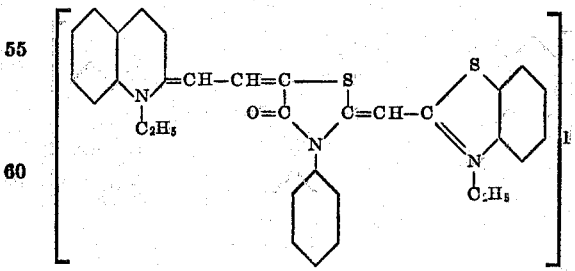

One gram of 2-(β-acetanilidovinyl)quinoline ethiodide, 1.0 gram of the product of Example I, 35 cc. of methanol, and 0.5 cc. of triethylamine were heated at reflux for 30 minutes. After cooling, the product was filtered and purified by recrystallization from methanol to yield 0.83 gram of a dye melting at 275–8° C. A solution of the dye in methanol showed an absorption maximum at 625 mμ, and a sensitization maximum in a silver bromide emulsion at 690 mμ.

Example XXIII

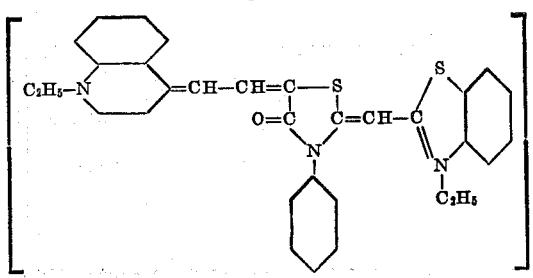

A mixture of 1.0 gram of 4-(β-anilinovinyl) quinoline ethiodide, 1.1 grams of the product of Example I, 50 cc. of methanol, 0.5 cc. of triethylamine and 0.5 cc. of acetic anhydride was heated at reflux for ½ hour. The reaction product separated and was purified by boiling out with methanol to yield 0.85 gram of dye crystals melting at 264–7° C. A solution of the dye in methanol showed an absorption maximum at 670 m$\mu$, and a sensitization maximum in a silver bromide emulsion at 730 m$\mu$.

Example XXIV

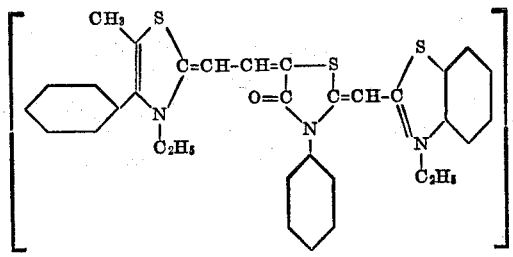

A mixture of 1.12 grams of 2(β-anilinovinyl)-5-methyl-4-phenylthiazole ethiodide, 1.08 grams of the product of Example I, 25 cc. of methanol, 5 cc. of acetic anhydride, and 1 cc. of triethylamine was heated at reflux for 20 minutes. After the addition of 5 cc. of 50% aqueous potassium iodide and cooling, 1.2 grams of dye separated and were purified by crystallization from 100 cc. of methanol, to yield 0.56 gram of the final product melting at 254–5° C. A solution of the dye in methanol showed an absorption maximum at 615 m$\mu$, and a sensitization maximum in a silver bromide emulsion at 670 m$\mu$.

Example XXV

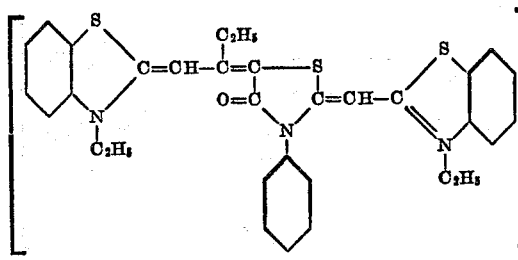

A solution of 1.33 grams of 2-(β-ethyl-β-methylmercaptovinyl) benzothiazole ethiodide, 1.51 grams of the product of Example I, 35 cc. of methanol, and 1 cc. of triethylamine was heated at reflux for 20 minutes. On cooling, 1.43 grams of dye separated as brassy colored prisms. After recrystallization from methanol, the crystals melted at 263–4° C. A methanol solution of the dye showed an absorption maximum at 600 m$\mu$, and a sensitization maximum in a silver bromide emulsion at 650 m$\mu$.

Example XXVI

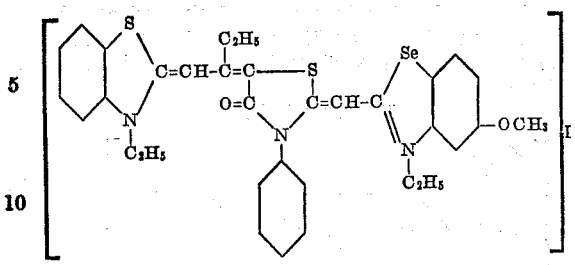

A solution of 1.0 gram of 2-(β-ethyl-β-methylmercaptovinyl) benzothiazole ethiodide, 1.3 grams of the product of Example V, and 0.5 gram of triethylamine in 35 cc. of methanol was heated at reflux for 30 minutes. The dye separated on cooling and was recrystallized from methanol to yield 0.83 gram of the final product melting at 256–8° C. The methanol solution of the dye showed an absorption maximum at 615 m$\mu$, and a sensitization maximum at 670 m$\mu$.

Example XXVII

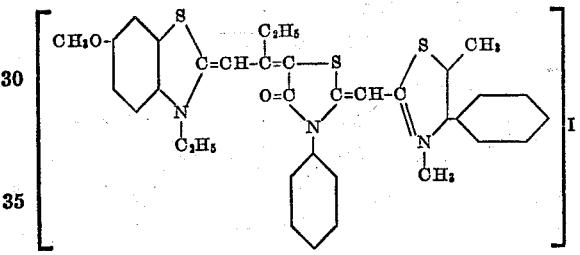

A mixture of 1.3 grams of 2-(β-ethyl-β-methylmercaptovinyl)-6-methoxybenzothiazole ethiodide, 1.5 grams of the product of Example XI, 35 cc. of methanol, and 1 cc. of triethylamine was heated at reflux for 30 minutes. The product which separated on cooling, was recrystallized from methanol to yield 1.06 grams of a final dye melting at 212–14° C. A solution of the dye in methanol showed an absorption maximum at 600 m$\mu$, and a sensitization maximum in a silver bromide emulsion at 650 m$\mu$.

Example XXVIII

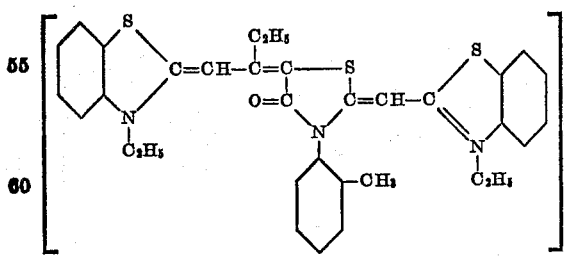

A mixture of 1.3 grams of 2-(β-ethyl-β-methylmercaptovinyl) benzothiazole ethiodide, 1.5 grams of the product of Example VI, 35 cc. of methanol, and 1 cc. of triethylamine was heated at reflux for 30 minutes. The product which separated on cooling was recrystallized from methanol to yield 1.06 grams of the final dye melting at 212–14° C. A solution of the dye in methanol showed an absorption maximum at 600 m$\mu$, and a sensitization maximum in a silver bromide emulsion at 650 m$\mu$.

Example XXIX

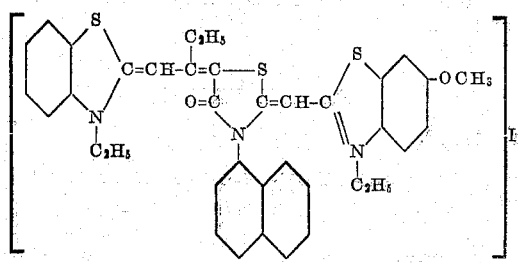

A solution of 0.26 gram of 2-(β-ethyl-β-methylmercaptovinyl) benzothiazole ethiodide, 0.33 gram of the product of Example VII, 15 cc. of methanol, and 0.5 cc. of triethylamine was boiled 30 minutes. After recrystallization from isopropanol, the dye weighed 0.2 gram and melted at 235–6° C. A methanol solution of the dye showed an absorption maximum at 600 m$\mu$, and a sensitization maximum in a silver bromide emulsion at 650 m$\mu$.

Example XXX

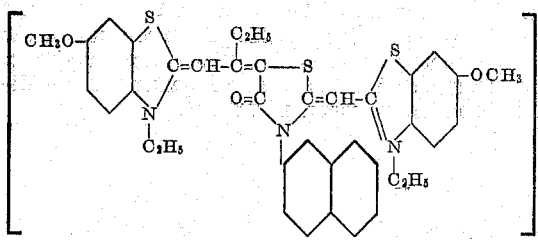

A mixture of 0.44 gram of 2-(β-ethyl-β-methylmercaptovinyl)-6-methoxybenzothiazole ethiodide, 0.5 gram of the product of Example IX, 25 cc. of methanol, and 0.5 cc. of triethylamine was treated as in Example XXVIII. After recrystallization from isopropanol, the dye weighed 0.35 gram and melted at 252–4° C. A solution of the dye in methanol showed an absorption maximum at 610 m$\mu$, and a sensitization maximum in a silver bromide emulsion at 670 m$\mu$.

Example XXXI

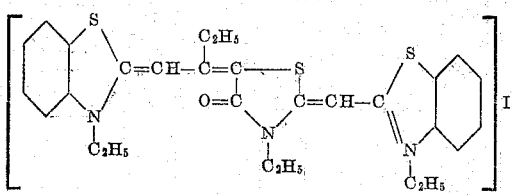

A mixture of 1.2 grams of 2-(β-ethyl-β-methylmercaptovinyl)benzothiazole ethiodide, 1.0 gram of the product of Example VIII, 35 cc. of methanol, and 0.5 cc. of triethylamine was heated at reflux for 30 minutes. The dye separated on cooling and was recrystallized from methanol to yield 1.18 grams of the final dye and melted at 280–1° C. The methanol solution of the dye showed an absorption maximum at 605 m$\mu$, and a sensitization maximum in a silver bromide emulsion at 660 m$\mu$.

Example XXXII

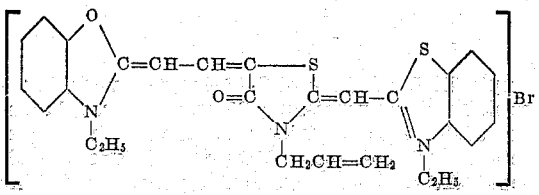

A mixture of 1.75 grams of 2-(β-anilinovinyl) benzoxazole ethobromide, 1.75 grams of the product of Example IV, and 20 cc. of isopropynol was warmed until the solids dissolved. Then, 5 cc. of acetic anhydride and 1 cc. of triethylamine were added and the mixture heated at reflux for 5 minutes. On cooling, 1.03 grams of dye separated and was purified by crystallization from 50 cc. of isopropanol, to yield 0.7 gram of the final dye and melted at 222–5° C. The solution of the dye in methanol showed an absorption maximum at 570 m$\mu$, and a sensitization maximum in a silver bromide emulsion at 610 m$\mu$.

Example XXXIII

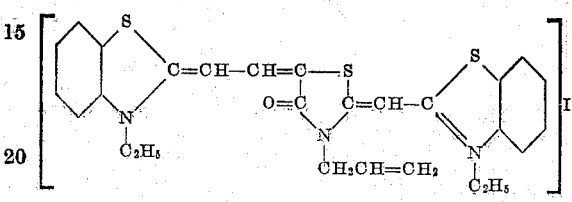

A mixture of 1.4 grams of 2-(β-acetanilidovinyl)-benzothiazole ethiodide, 0.9 gram of the product of Example IV, 30 cc. of isopropanol, and 1 cc. of triethylamine was boiled for 5 minutes. After standing 12 hours, the product was filtered and crystallized from 150 cc. of methanol to yield 0.78 gram of the final dye and melted at 253–5° C. A solution of the dye in methanol showed an absorption maximum at 595 m$\mu$, and a sensitization maximum in a silver bromide emulsion at 645 m$\mu$.

Example XXXIV

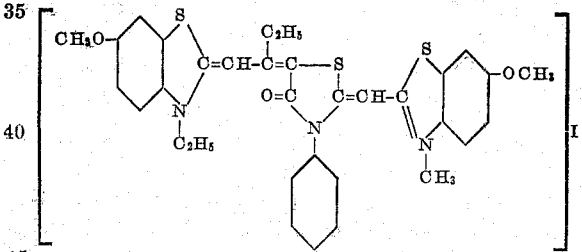

A mixture of 0.85 gram of 2-(β-ethyl-β-methylmercaptovinyl)-6-methoxybenzothiazole ethiodide, 0.93 gram of the product of Example II, 50 cc. of methanol, and 0.5 cc. of triethylamine was refluxed for 5 minutes. After cooling, the greenish-brassy prisms were collected and purified by boiling out with methanol to yield 0.84 gram of the final product and melted at 243–4° C. The methanol solution of the dye showed an absorption maximum at 620 m$\mu$, and a sensitization maximum in a silver bromide emulsion at 680 m$\mu$.

Example XXXV

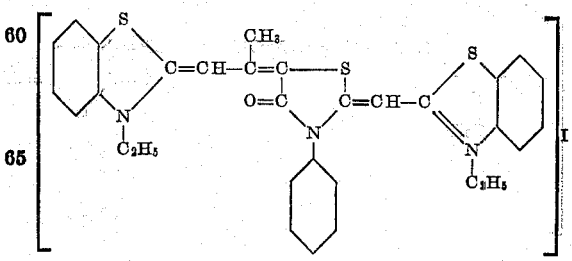

A mixture of 0.76 gram of 2-(β-methyl-β-methylmercaptovinyl)benzothiazole ethiodide, 0.87 gram of the product of Example I, 25 cc. of methanol and 0.5 cc. of triethylamine was heated at reflux for 10 minutes. The dye was filtered after cooling and purified by boiling out with methanol to yield 0.92 gram of the purified dye melting at 245–6° C. A solution of the dye in methanol showed an absorption maximum at 600 mμ, and a sensitization maximum in a silver bromide emulsion at 650 mμ.

*Example XXXVI*

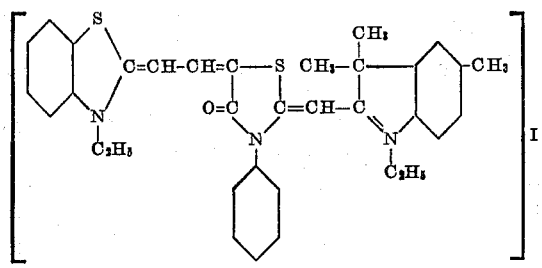

A solution of 0.87 gram of 2-(β-acetanilidovinyl)benzothiazole ethiodide and 0.85 gram of the product of Example III in 25 cc. of isopropanol was treated with 0.5 cc. of triethylamine and boiled for 15 minutes. The product was purified by boiling out with methanol to yield greenish prisms (0.86 gram) melting at 291–3° C. The methanol solution of the dye showed an absorption maximum at 635 mμ, and a sensitization maximum in a silver bromide emulsion at 690 mμ.

*Example XXXVII*

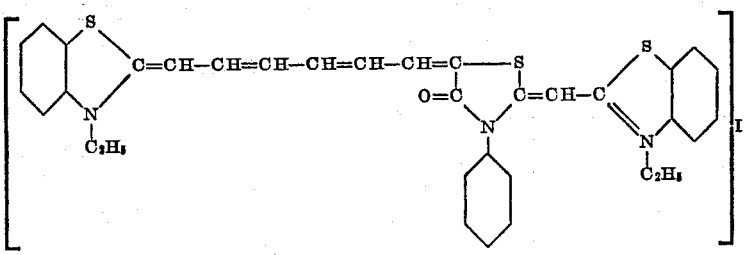

A mixture of 1.0 gram of 2-(6-anilino-1,3,5-hexatrienyl)-benzothiazole ethiodide and 1.0 gram of the product of Example I was dissolved in 25 cc. of methanol. The solution was cooled to 50° C., 0.5 cc. of piperidine added and subsequently stirred for 10 minutes without additional heating. The dye separated on cooling and was recrystallized from methanol to yield 0.68 gram of the final product melting at 204–5° C. The methanol solution of the dye showed an absorption maximum at 822 mμ, and a sensitization maximum in a silver bromide emulsion at 840 mμ.

*Example XXXVIII*

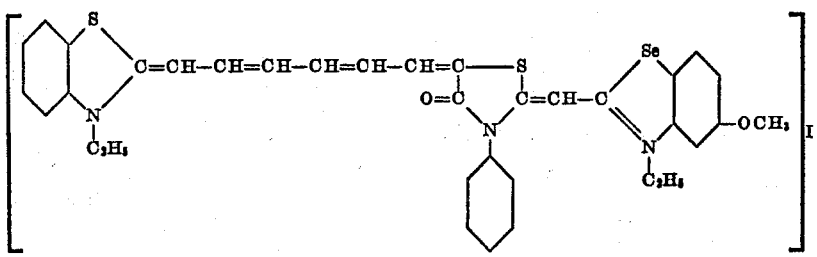

A mixture of 0.5 gram of 2-(6-anilino-1,3,5-hexatrienyl)-benzothiazole ethiodide, 0.43 gram of the product of Example V, 25 cc. of methanol and 0.5 cc. of piperidine was treated as in Example XXXVI. There was obtained 0.25 gram of dye melting at 198–199° C. The methanol solution of the dye showed an absorption maximum at 793 mμ, and a sensitization maximum in a silver bromide emulsion at 845 mμ.

*Example XXXIX*

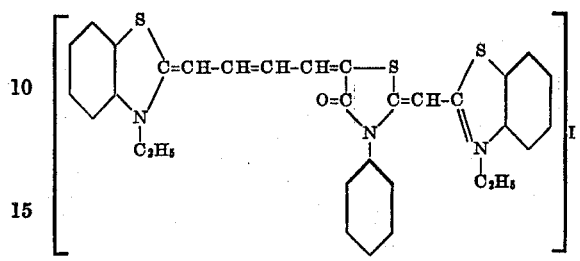

A mixture of 0.5 gram of 2-(4-acetanilido-1,3-butadienyl)-benzothiazole ethiodide, 0.37 gram of the product of Example I, 20 cc. of methanol, and 0.5 cc. of triethylamine was boiled for 10 minutes. The dye which separated on cooling was recrystallized from methanol to yield 0.19 gram of the final product melting at 223° C. A solution of the dye in methanol showed an absorption maximum at 685 mμ, and a sensitization maximum in a silver bromide emulsion at 740 mμ.

*Example XXXX*

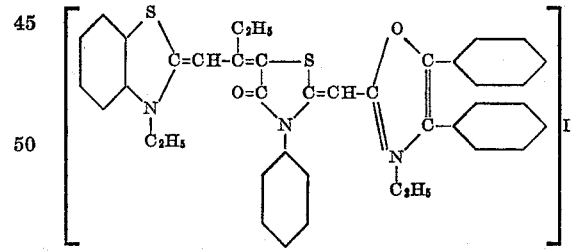

A mixture of 0.6 gram of the product of Example XIV, 0.4 gram of 2-(β-ethyl-β-methylmercaptovinyl)benzothiazole, 20 cc. of isopropyl alcohol and 0.5 cc. of triethylamine was heated at reflux for 20 minutes. After cooling, dye crystals separated and were purified by recrystallization from isopropyl alcohol to yield 0.1 gram of the final product melting at 184–6° C. A solution of the dye in methanol showed an absorption maximum at 571 mμ, and a sensitization maximum in a silver bromide emulsion at 620 mμ.

It is evident from the foregoing examples that the procedure employed in the preparation of the trinuclear cyanine dyes is simple, requires a shorter period of time than the conventional method, and gives dyes in excellent yield and in readily purifiable form.

It is to be understood that the term "treating," as employed in the appended claims, is used in a generic sense to include either the bringing together of the co-reactants at room temperature, heating the co-reactants to reflux, or warming or boiling the co-reactants in a suitable solvent.

While I have disclosed the preferred embodiments of my invention and the preferred modes of carrying the same into effect, it will be readily apparent to those skilled in the art that many variations may be made therein, without departing from the spirit thereof. Accordingly, the scope of my invention is to be limited solely by the appended claims.

I claim:

1. A process for the production of trinuclear cyanine dyestuffs comprising treating a thiazolone of the general formula:

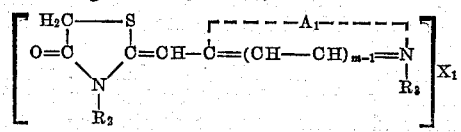

with a cyclammonium quaternary salt of the general formula:

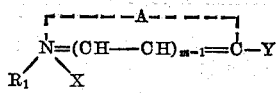

wherein A and $A_1$ are each selected from the group consisting of the residues of heterocyclic nitrogenous compounds of the type used in the preparation of cyanine dyes, $m$ represents an integer from 1 to 2, $R_1$ and $R_3$ are each selected from the group consisting of alkyl, hydroxyalkyl, alkoxyalkyl, and aralkyl groups, $R_2$ is selected from the group consisting of alkyl, allyl, aryl, and aralkyl groups, X and $X_1$ represent an acid radical, and Y represents a reactive group selected from the class consisting of alkylmercapto, arylmercapto, β-alkylmercaptovinyl, β-arylmercaptovinyl, β-alkylmercapto-β-alkylvinyl, β-alkylmercapto-β-arylvinyl, β-anilinovinyl, β-acetanilidovinyl, β-piperidinovinyl, β-morpholinovinyl, 4-acetanilido-1,3-butadienyl, 4-anilino-1,3-butadienyl, 4-piperidino-1,3-butadienyl, 4-morpholino-1,3-butadienyl, 6-acetanilido-1,3,5-hexatrienyl, 6-anilino-1,3,5-hexatrienyl, 6-piperidino-1,3,5-hexatrienyl, and 6-morpholino-1,3,5-hexatrienyl.

2. A process for the production of a trinuclear cyanine dyestuff characterized by the following formula:

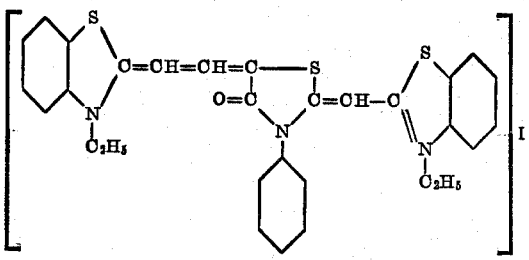

which comprises treating a thiazolone of the formula:

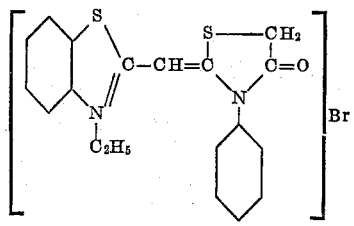

with 2-(β-acetanilidovinyl)benzothiazole ethiodide, in the presence of an aliphatic alcohol and a basic condensing agent.

3. A process for the production of a trinuclear cyanine dyestuff characterized by the following formula:

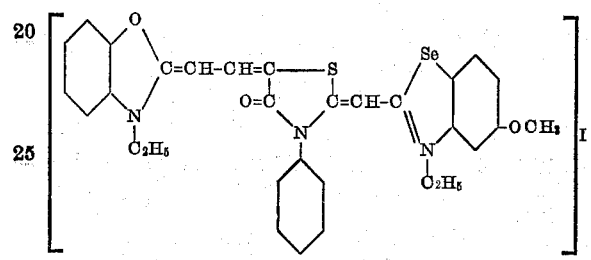

which comprises treating a thiazolone of the formula:

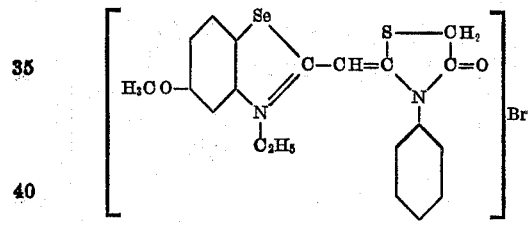

with 2-(β-acetanilidovinyl)benzoxazole ethiodide, in the presence of an aliphatic alcohol and a basic condensing agent.

4. A process for the production of a trinuclear cyanine dyestuff characterized by the following formula:

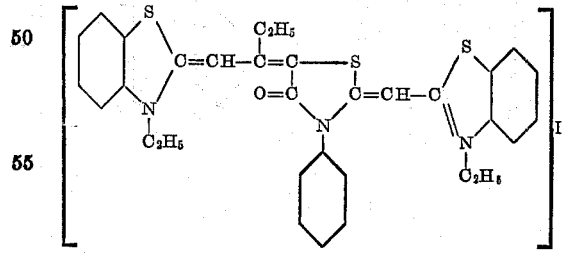

which comprises treating a thiazolone of the formula:

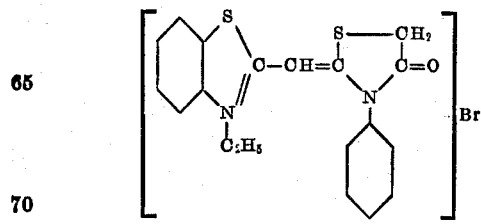

with 2-(β-ethyl-β-methylmercaptovinyl)benzothiazole ethiodide, in the presence of an aliphatic alcohol and a basic condensing agent.

5. A process for the production of a trinuclear cyanine dyestuff characterized by the following formula:

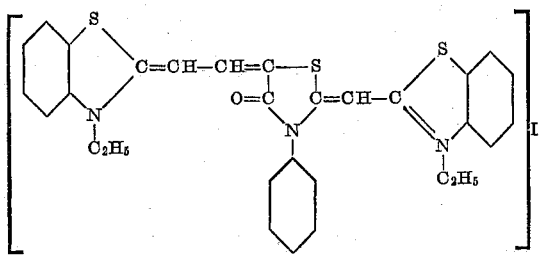

which comprises treating a thiazolone of the formula:

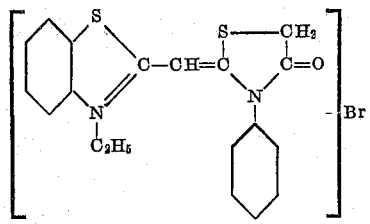

with 2-(β-acetanilidovinyl)benzothiazole ethiodide, in the presence of methanol and triethylamine.

6. A process for the production of a trinuclear cyanine dyestuff characterized by the following formula:

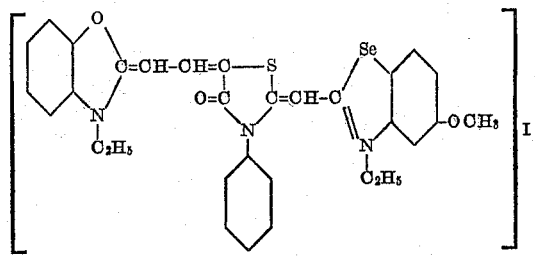

which comprises treating a thiazolone of the formula:

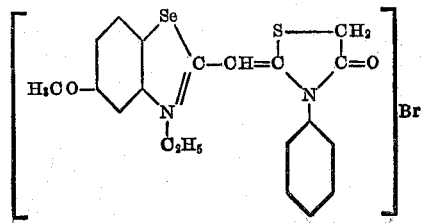

with 2-(β-acetanilidovinyl)benzoxazole ethiodide, in the presence of methanol and triethylamine.

7. A process for the production of a trinuclear cyanine dyestuff characterized by the following formula:

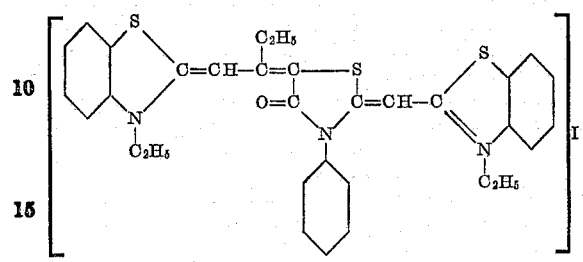

which comprises treating a thiazolone of the formula:

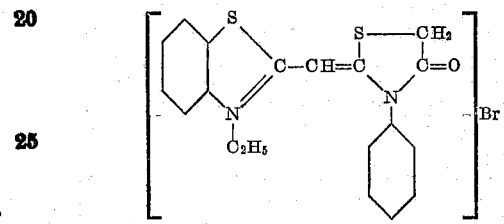

with 2-(β-ethyl-β-methylmercaptovinyl)benzothiazole ethiodide, in the presence of methanol and triethylamine.

8. The process according to claim 1, wherein the treatment is conducted by heating the thiazolone and cyclammonium quaternary salt.

THOMAS R. THOMPSON.

REFERENCES CITED

The following references are of record in the file of this patent:

UNITED STATES PATENTS

| Number | Name | Date |
|---|---|---|
| 2,153,931 | Barent | Apr. 11, 1939 |
| 2,265,907 | Kendall | Dec. 9, 1941 |
| 2,388,963 | Fry | Nov. 13, 1945 |
| 2,440,119 | Reister | Apr. 20, 1948 |